United States Patent [19]
Knapick et al.

[11] Patent Number: 5,728,270
[45] Date of Patent: Mar. 17, 1998

[54] PROCESS FOR MAKING THE ABSORBENT GRANULAR MATERIAL

[75] Inventors: Edward G. Knapick, Ogdensburg; Brent Willemsen, Westfield; Ernest P. Wolfer, Allendale, all of N.J.

[73] Assignee: Marcal Paper Mills, Inc., Elmwood Park, N.J.

[21] Appl. No.: 751,435

[22] Filed: Nov. 18, 1996

Related U.S. Application Data

[63] Continuation of Ser. No. 576,850, Dec. 22, 1995, abandoned, which is a continuation of Ser. No. 118,186, Sep. 9, 1993, abandoned.

[51] Int. Cl.$^6$ ............................................. D21F 1/66
[52] U.S. Cl. ............................................. 162/189; 162/4
[58] Field of Search ............................................. 162/190, 189, 162/4, DIG. 10, 56, 55; 264/15, 117; 117/171, 172, 173

[56] References Cited

U.S. PATENT DOCUMENTS

| | | |
|---|---|---|
| 622,054 | 3/1899 | Marsden . |
| 888,148 | 5/1908 | Kokkenwadel . |
| 892,754 | 7/1908 | May . |
| 907,403 | 12/1908 | Redfearn . |
| 966,060 | 8/1910 | Severns . |
| 1,758,735 | 5/1930 | Conrad . |
| 2,182,274 | 12/1939 | Baker et al. . |
| 2,198,013 | 4/1940 | Olcott . |
| 2,287,759 | 6/1942 | Hardesty et al. . |
| 2,877,599 | 3/1959 | Hebestreet et al. . |
| 2,880,519 | 4/1959 | Pollock . |
| 2,916,412 | 12/1959 | Altmann et al. ............ 162/4 |
| 2,952,866 | 9/1960 | Sackett . |
| 3,003,911 | 10/1961 | Lindstrom et al. . |
| 3,011,876 | 12/1961 | Raistrick . |
| 3,047,453 | 7/1962 | Shook, Jr. . |
| 3,059,615 | 10/1962 | Kuceski et al. . |
| 3,142,862 | 8/1964 | Guldman . |
| 3,188,751 | 6/1965 | Sutton . |
| 3,235,444 | 2/1966 | Kruger . |
| 3,252,785 | 5/1966 | Hoblit . |
| 3,256,857 | 6/1966 | Karras . |
| 3,381,460 | 5/1968 | Sokolowski . |
| 3,449,106 | 6/1969 | Paden et al. . |
| 3,506,536 | 4/1970 | Jacquelin . |
| 3,564,083 | 2/1971 | Fournet et al. . |

(List continued on next page.)

FOREIGN PATENT DOCUMENTS

| | | |
|---|---|---|
| 2090665 | 10/1993 | Canada . |
| 0039522 | 11/1981 | European Pat. Off. . |
| 0111467 | 6/1984 | European Pat. Off. . |
| 1 454 743 | 1/1969 | Germany . |
| 23 58 808 | 6/1975 | Germany . |
| 3017352 | 11/1981 | Germany . |
| 33 43 965 | 12/1984 | Germany . |
| 4130472 | 3/1993 | Germany . |
| 52-45595 | 4/1977 | Japan . |
| 52-62189 | 5/1977 | Japan . |
| 53-51662 | 5/1978 | Japan . |
| 293892 | 7/1928 | United Kingdom . |

*Primary Examiner*—Brenda A. Lamb
*Attorney, Agent, or Firm*—Burns, Doane, Swecker & Mathis, L.L.P.

[57] ABSTRACT

In a process for making a granular material from a reject stream from a coated grade waste paper pulp stock recycling process, the pulp stock is screened so that the reject stream passes through a screen and long fibers are retained for use in making paper. Solid material in the reject stream is separated by flotation. Water is removed from the reject stream to increase its consistency to that of modelling clay. The reject stream is supplied to an agglomerator which forms uniform granules of irregular but approximately spherical shape. The granules are then dried so that the granules have a solids content greater than 95%. Apparatus for performing the process and characteristics of granular material formed by the process and apparatus are also described.

26 Claims, 1 Drawing Sheet

U.S. PATENT DOCUMENTS

| | | |
|---|---|---|
| 3,589,977 | 6/1971 | Fournet . |
| 3,672,945 | 6/1972 | Taylor . |
| 3,675,625 | 7/1972 | Miller et al. . |
| 3,723,321 | 3/1973 | Thomas . |
| 3,747,564 | 7/1973 | Bickoff et al. . |
| 3,789,797 | 2/1974 | Brewer ................................. 119/1 |
| 3,828,731 | 8/1974 | White . |
| 3,900,547 | 8/1975 | Hunt et al. . |
| 3,904,726 | 9/1975 | Jacquelin et al. . |
| 3,916,831 | 11/1975 | Fisher .................................. 119/1 |
| 3,921,581 | 11/1975 | Brewer ................................. 119/1 |
| 3,929,446 | 12/1975 | Trocino . |
| 3,942,970 | 3/1976 | O'Donnell . |
| 3,980,050 | 9/1976 | Neubauer . |
| 4,106,991 | 8/1978 | Markussen et al. . |
| 4,108,932 | 8/1978 | Takewell et al. . |
| 4,116,760 | 9/1978 | Kennedy . |
| 4,134,725 | 1/1979 | Büchel et al. . |
| 4,137,029 | 1/1979 | Brooks . |
| 4,148,952 | 4/1979 | Nelson et al. . |
| 4,157,696 | 6/1979 | Carlberg ............................... 119/1 |
| 4,163,674 | 8/1979 | Been ............................... 106/15.05 |
| 4,203,388 | 5/1980 | Cortigene et al. . |
| 4,225,382 | 9/1980 | Kearney et al. . |
| 4,241,001 | 12/1980 | Lamond et al. . |
| 4,263,873 | 4/1981 | Christianson . |
| 4,269,859 | 5/1981 | Morse . |
| 4,277,328 | 7/1981 | Pfalzer et al. . |
| 4,305,345 | 12/1981 | Otoguro . |
| 4,311,115 | 1/1982 | Litzinger . |
| 4,341,180 | 7/1982 | Cortigene et al. .................. 119/1 |
| 4,343,680 | 8/1982 | Field et al. . |
| 4,343,751 | 8/1982 | Kumar ................................. 264/37 |
| 4,356,060 | 10/1982 | Neckermann et al. . |
| 4,374,794 | 2/1983 | Kok . |
| 4,378,756 | 4/1983 | Whiteman . |
| 4,407,231 | 10/1983 | Colborn et al. ....................... 119/1 |
| 4,409,925 | 10/1983 | Brundrett et al. .................... 119/1 |
| 4,438,263 | 3/1984 | Morse . |
| 4,458,629 | 7/1984 | Gerber ................................. 119/1 |
| 4,459,368 | 7/1984 | Jaffee et al. . |
| 4,492,729 | 1/1985 | Bannerman et al. . |
| 4,495,482 | 1/1985 | Philipp ................................. 338/21 |
| 4,497,688 | 2/1985 | Schaefer . |
| 4,537,877 | 8/1985 | Ericsson . |
| 4,560,527 | 12/1985 | Harke et al. . |
| 4,619,862 | 10/1986 | Sokolowski et al. . |
| 4,621,011 | 11/1986 | Fleischer et al. . |
| 4,664,064 | 5/1987 | Lowe . |
| 4,712,508 | 12/1987 | Lowe . |
| 4,721,059 | 1/1988 | Lowe et al. . |
| 4,734,393 | 3/1988 | Lowe et al. . |
| 4,832,700 | 5/1989 | Kaspar et al. . |
| 4,930,443 | 6/1990 | Lowe, Jr. et al. . |
| 4,931,139 | 6/1990 | Phillips . |
| 4,983,258 | 1/1991 | Maxham . |
| 5,002,633 | 3/1991 | Maxham . |
| 5,019,564 | 5/1991 | Lowe et al. . |
| 5,094,604 | 3/1992 | Chavez et al. . |
| 5,146,877 | 9/1992 | Jaffee et al. . |
| 5,176,822 | 1/1993 | Iwashige et al. . |
| 5,196,473 | 3/1993 | Valenta et al. . |
| 5,352,780 | 10/1994 | Webb et al. . |

PROCESS FOR MAKING THE ABSORBENT GRANULAR MATERIAL

CROSS-REFERENCE TO RELATED APPLICATIONS

This application is a continuation of U.S. application Ser. No. 08/576,850 filed Dec. 22, 1995, now abandoned which is a continuation of U.S. application Ser. No. 08/118,186 filed Sep. 9, 1993, now abandoned.

FIELD OF THE INVENTION

The present invention relates to recycling waste paper, and more particularly to recycling processes for making absorbent granular materials from waste paper.

BACKGROUND OF THE INVENTION

Paper recycling has, in recent years, become a more important and attractive option to disposal of waste paper by deposition in landfills or by incineration. It has been a common practice for many years to make paper, especially tissue, from recycled paper. Typically, the waste paper is supplied to a hydropulper where the paper is pulped with caustic, dispersants and large amounts of water to form a slurry of fibers, fines and fillers. The slurry passes through a de-inking treatment, and possibly other treatments, and then is supplied to a paper making machine where fibers are removed from the slurry to make the paper (paper-making fibers). The reject stream from the pulping process generally includes significant amounts of organic materials such as cellulosic fibers too short to be of use in making recycled paper (short fibers), along with tannin, lignin, etc., and inorganic materials, particularly kaolin clay, calcium carbonate and titanium dioxide, which are suspended in the water used in the recycling process. In view of stringent water quality standards, it is desirable to recycle the water from the recycling process by removing the reject material from the waste stream. It is further desirable to provide a use for the reject materials removed from the waste stream.

Various processes have been proposed for recovering paper-making fibers from post-consumer waste paper and magazines for use in making paper. The shorter fibers (generally less than 1.0 mm in length) are not satisfactory for making paper and are removed with the reject stream. Often the reject stream is dewatered and then sent to a landfill or incinerator. However, restrictions on landfills and incinerators make the disposal of the rejects prohibitively expensive. As an alternative, it has been proposed to convert the reject into useful products. Such products include industrial absorbents for oil and water, and animal litter and feed. These products are also used as soil conditioners and agricultural carriers for spreading pesticides, and as fillers for building materials.

U.S. Pat. Nos. 3,980,050; 4,203,388; 4,560,527; and 4,621,011, for example, disclose processes for turning a waste material, such as waste paper, newsprint, etc., into useful products including animal litter, oil absorbent, mulch, or a carrier for other materials. The fibers from the waste material are formed into particles and dried.

SUMMARY OF THE INVENTION

It is an object of the present invention to provide an efficient and economical process for utilizing waste paper materials in producing useful granular products. More particularly, an object of this invention is to beneficially reuse a portion of the waste paper that is not acceptable for papermaking.

The process of this invention utilizes waste paper, preferably office waste that is printed with laser print, Xerox print, or other inks, and magazines that have a coated surface. The waste paper is pulped with water, caustic and surfactants to produce a slurry containing paper fibers, paper fines and fillers. After several washing steps, the slurry passes through a wire washer which separates paper-making fibers from the fines and filler. The paper-making fiber stream, also referred to as the "accepts stream", is directed to a conventional papermaking machine for processing into paper. The filtrate from the washer continues through the process of this invention by flowing into a flotation clarifier where the suspended solids (fines and filler) are concentrated as a flotate and clarified water is removed for reuse in the process.

In order to sterilize the absorbent material without using biocidal chemicals, the flotate is pasteurized at a minimum temperature of 160° F. This flotate is then passed through a belt press where the water content is further reduced. The filter cake from the belt press is in the form of a gray, wet cake that resembles and has the consistency of modeling clay. The wet cake then passes, by means of a screw conveyor, to an agglomerator where the material is formed into a granular shape. The wet granules are then sent through a conveyor dryer to produce dry granules of irregular shape and having good absorbent characteristics.

The granules produced by this process have a high absorbency toward liquids. Their composition, by weight, is approximately 50% inorganic fillers (kaolin clay, calcium carbonate, titanium dioxide) and 50% organic (cellulose fines, starches, tannins, lignin, etc.). Less than 10% of the cellulosic material is in the form of fibers greater than 1 mm in length. The bulk density of the granules is between 28–35 lbs./cu.ft. These granules are useful as oil and water absorbents as well as carriers for agricultural chemicals.

DESCRIPTION OF THE DRAWING

A preferred embodiment of the invention is illustrated in the accompanying drawing, in which.

DETAILED DESCRIPTION

Figure 1:
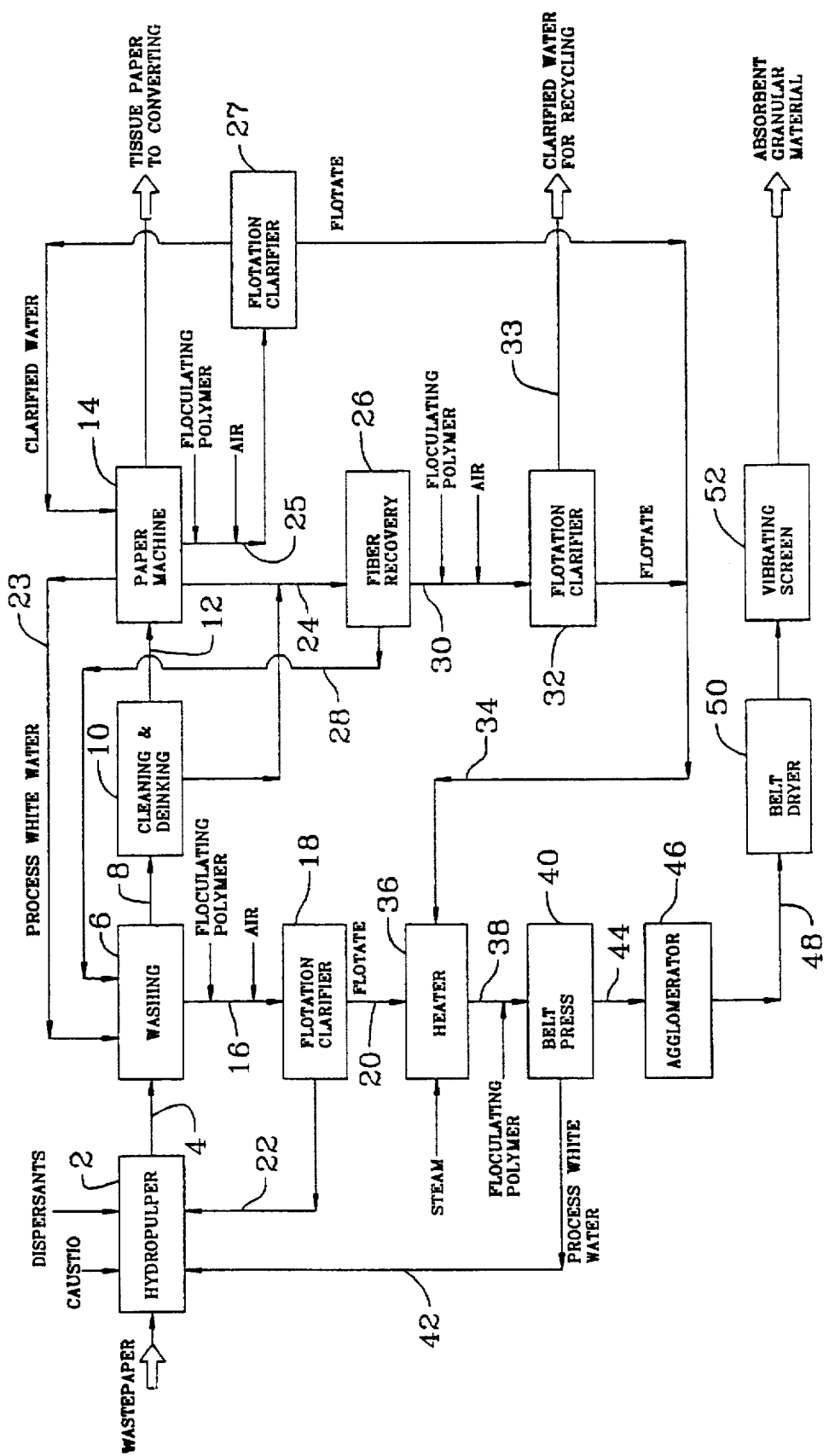
FIG. 1 is a schematic view of the process and apparatus for performing the process for manufacturing the granules according to the present invention.

The process of this invention utilizes waste paper that is collected from offices or other sources that contain primarily recyclable paper grades, including magazines (with clay-based coatings) and writing grades (with laser print, Xerox print and other inks). Paper-making fibers that can be used to make paper are separated in this process from a reject stream which includes inks, fines (cellulose less than 0.1 mm in length) and fillers (kaolin clay, calcium carbonate, titanium oxide, etc.).

Referring to FIG. 1, waste paper is supplied to a hydropulper 2 along with clarified water, caustic agents, such as sodium hydroxide, and dispersants to separate the fiber from the other components of the waste paper. Plastics, debris and other foreign objects are removed by conventional means. The pulp slurry from the hydropulper, which contains more than 95% water, passes through a pipe 4 to a washer 6 where several conventional washing steps are performed. In the washer 6, the slurry flows over wire screens where paper-making fibers are retained on the screens and the reject stream passes through the screen and is conducted out of the washer through a pipe 8. The paper-making fibers that are retained on the screen are subject to further cleaning, de-inking and processing, indicated at 10, before being supplied through a pipe 12 to a papermaking machine 14. More than 95% of the long fibers in the pulp slurry are removed and pass into the pipe 12.

The reject stream from the wire screen washer 6 is in the form of a slurry containing less than 1% solids, including cellulosic fines and fillers. Typically 50% of the solids are fillers such as kaolin clay, calcium carbonate and titanium dioxide. The remaining 50% is mostly cellulose fines which are less than 1 mm in length, with some sugars, tannins, lignins, etc. This slurry, which contains between 99% and 99.5% water, is conducted through the pipe 16 to a dissolved air flotation clarifier 18. Suitable clarifiers are commercially available (e.g., Supracell from Krofta, or Deltafloat from Meri). A flocculating polymer, such as Drewfloc 441 from Drew Chemical Co., or Calgon TRP 945, and air are added to the reject stream in the pipe 16 before it enters the clarifier. The slurry fills the clarifier 18, and the flocculated suspended solids float on the air bubbles to the surface of the clarifier. At this point, the mat of solids, which has a consistency of 3–6%, is skimmed or raked off the surface and removed from the clarifier through the pipe 20. The clarified water from the clarifier 18 is conducted back into the hydropulper 2 through the pipe 22.

In accordance with this invention, mill process effluent that contains long fibers may be utilized to increase the efficiency of the process. This effluent would include reject water streams, spills from pulp and paper mills, etc. In FIG. 1, the effluent stream would include a process white water stream 23 from the papermaking machine 14, an overflow stream 24 which would previously have been discharged to a sewer, and a white water stream 25. The process white water is returned to the washer 6. The overflow stream 24 is supplied to a fiber recovery process 26 where the stream passes through screens that separate the paper-making fibers in a similar manner to the washer 8. Paper-making fibers with water are supplied through the pipe 28 from the fiber recovery unit 26 to the washer 6. A fiber-free slurry flows through the pipe 30 to a flotation clarifier 32 that operates in the same manner as the clarifier 18. The white water stream 25 from the papermaking machine is supplied to another flotation clarifier 27 where the flocculated suspended solids are removed in the same manner as in the clarifier 18. A stream containing 3–7% solids passes out of the clarifier 32 and the clarifier 27 through the pipe 34. Clarified water from the clarifier 32 flows through the pipe 33 and is available for use in the process.

The flotate from the clarifiers 18, 27 and 32 is mixed to form a single concentrated stream and is supplied to a heater 36. The heater 36 may be of any suitable type, such as a steam injection unit, or a heat exchanger. The flow rate of the stream and the heat applied should be sufficient to raise the temperature of the stream for sufficient time to achieve pasteurization of the stream. Preferably, the stream should be heated to a temperature of at least 160° F.

The stream passes out of the heat exchanger 36 through a pipe 38, and a second flocculating polymer (such as Drewfloc 453 from Drew Chemical Co.) is added to the slurry to cause the solids to agglomerate before the slurry enters a belt press 40. The belt press can be any one of the commercially-available units (e.g., Kompress Belt Filter Press, Model GRS-S-2.0 from Komline Sanderson). At the outlet of the belt press, the filter cake is 35–40% solids and has the consistency of moist modeling clay. Process white water from the belt press is returned to the hydropulper 2 through the pipe 42.

The filter cake from the belt press 40 is conveyed by means of a screw conveyor 44 to a pin-mixer type agglomerator 46. In the agglomerator 46 (such as Dust-Maler Model #020 from Feeco International), the filter cake is broken up by the rotating pins, so that uniform granules are formed as the material progresses from the inlet of the agglomerator to the outlet. It has been found that the agglomerator 46 produces optimum size particles by running in the middle of its speed range, which is at 540 RPM. Higher speeds give larger particles than desired. Lower speeds yield a larger variability in sizes, with no net increase in smaller sized granules. It is important that no additional water be added to the agglomerator, since the slurry passing through should have a consistency of 35–45% in order to yield the desired size and texture of the granules. A higher consistency produces more fines and a lower consistency produces larger and more variable sized granules. The lignin, tannin and starch in the slurry serve as the binder for the granules.

From the agglomerator 46, the granulated, but still moist stream material moves, preferably under the force of gravity on a swing conveyor 48, to the belt of a conveyor drier 50, such as a Proctor & Schwartz two-stage conveyor dryer. The conveyor dryer 50 preferably includes a housing through which the granular material moves while supported on the belt. The belt is porous and a heater blows hot air though the belt to dry the granules. At the outlet, the granules have a minimum solids content of 90% by weight, and preferably greater than 95%.

Vibrating screens 52, such as manufactured by Sweco, are used to classify the material by size according to product specifications.

The granules produced by this process contain approximately 50% by weight of organic materials, such as cellulosic fines, starches, tannins and lignins. This process removes at least 90% of fibers over 1 mm in length, and the granules contain less than 10% paper-making fiber. The inorganic fillers comprise about 50% by weight of the granules and are made up primarily of kaolin clay, calcium carbonate and titanium dioxide. The granules have an irregular, generally spherical shape. The granules from the conveyor dryer vary in size. Typically, 50% will be retained on an 8×16 mesh screen, i.e., 50% would pass through an U.S. Sieve No. 8 mesh screen but would be retained on a 16 mesh screen. Typically, the remaining portion would be 44% in the 16×30 mesh size range, and 6% in the 30×60 mesh size range. The granules have a bulk density of between 28–35 lbs/cu. ft.

The granular material according to the present invention is preferably able to withstand agitation such as might occur during shipment, handling, and storage. Resistance to attrition of the granules is between 90 and 95%. This percentage is based on the following test procedure. A weight of 75 grams of sample is shaken on a 60 mesh screen for ten minutes and 50 grams of the material retained is then shaken in a pan for ten minutes with ten steel balls (⅝" in diameter). The entire sample is then shaken on a 60 mesh screen for ten minutes. The percentage of the original 50 grams retained on the 60 mesh screen is the resistance to attrition cited above.

Granular material according to the present invention has been found to generally have a pH between 9.0–9.4. For an agricultural carrier application, pH must be no higher than 8.0. The pH of the agricultural carrier may be lowered by adding a pH lowering additive.

Granular material according to the present invention is adapted to absorb various liquids to desired degrees as a function of percentage of weight of the granules. The granular material according to the present invention for use as an agricultural carrier preferably has a liquid holding capacity (LHC) toward chlorobenzene of between 26–29%. The material for use as a floor absorbent, when tested with material retained on an 8×35 mesh, preferably is able to absorb between 73–81% of its weight of water, and preferably between 51–62% of its weight of oil.

While this invention has been illustrated and described in accordance with preferred embodiments, it is recognized that variations and changes may be made therein without departing from the invention as set forth in the claims.

What is claimed is:

1. A process for making a granular absorbent material from waste paper containing at least kaolin clay and papermaking fibers, comprising the steps of:
   (a) forming pulp slurry from waste paper containing at least water, kaolin clay and papermaking fibers;
   (b) screening the pulp slurry so as to produce a main stream containing papermaking fibers and to produce a main reject stream containing at least water and kaolin clay and containing less than ten percent (10%) papermaking fibers;
   (c) clarifying the main reject stream by flotation to produce a main concentrated stream of solid components including kaolin clay;
   (d) de-watering the concentrated stream to form a filter cake having a consistency of about 35 to about 40 percent;
   (e) forming granules having a consistency of 35 to 45 percent and having less than ten percent (10%) papermaking fibers from the filter cake; and
   (f) drying the granules until the granules have a solids content greater than 90%.

2. A process for making an absorbent material from waste paper containing at least kaolin clay and paper-making fibers, comprising the steps of:
   (a) forming pulp slurry from waste paper containing at least water, kaolin clay and paper-making fibers;
   (b) screening the pulp slurry so as to produce a main stream containing paper-making fibers and to produce a main reject stream containing at least water and kaolin clay;
   (c) clarifying the main reject stream by flotation to produce a main concentrated stream of solid components including kaolin clay;
   (d) de-watering the concentrated stream to form a filter cake having a consistency of between about 35 and 40 percent; and
   (e) heating the concentrated stream to pasteurization temperature after the clarifying step.

3. The process according to claim 1, wherein the drying step is carried out in a belt dryer.

4. The process according to claim 1, wherein the main reject stream before said clarifying step contains less than 1% solids.

5. The process according to claim 4, wherein the concentrated stream produced in said clarifying step has a consistency of between 3% and 6%.

6. The process according to claim 1, wherein the step of forming granules is carried out without the addition of any liquid.

7. The process according to claim 1, including classifying the granules after the drying step.

8. The process according to claim 1, wherein the filter cake is conveyed to a pin-mixer which breaks up the filter cake to thereby result in the granules.

9. The process according to claim 8, wherein said step of de-watering results in water which is used to form said pulp slurry.

10. The process according to claim 8, including adding a flocculating polymer and air to the main reject stream prior to the clarifying step.

11. A process for producing granular absorbent material, comprising:
   preparing a pulp slurry from waste paper that includes at least water, kaolin clay and papermaking fibers;
   continuously separating the pulp slurry into a first stream which contains papermaking fibers and a second stream which is in the form of a slurry containing at least water and kaolin clay;
   conducting the first stream to a papermaking machine;
   cleaning the papermaking fibers in the first stream before the papermaking machine, the cleaning step taking place at a location downstream from the separating step;
   clarifying the second stream to produce a concentrated stream of solid components containing kaolin clay by conveying the second stream to a flotation clarifier in which solid components of the second stream float upwardly for removal from the flotation clarifier;
   removing water from the concentrated stream of solid components to produce a filter cake;
   forming from the filter cake a granular material having a consistency of 35 to 45 percent and containing the kaolin clay; and
   drying the granular material to produce granular material having a solids content of at least 90%.

12. The process according to claim 11, including heating the concentrated stream of solid components to achieve pasteurization of the concentrated stream.

13. The process according to claim 12, wherein the concentrated stream of solid components is heated to at least 160° F.

14. The process according to claim 11, including adding a flocculating polymer to the second stream.

15. The process according to claim 11, including adding a first flocculating polymer to the second stream to cause solids in the second stream to agglomerate before the clarifying step and adding a second flocculating polymer to the concentrated stream before the step of removing water from the concentrated stream.

16. The process according to claim 11, wherein the filter cake contains about 50% inorganic fillers including the kaolin clay and is conveyed to a pin-mixer which breaks up the filter cake to thereby result in the granular material.

17. The process according to claim 11, wherein the water which is removed from the concentrated stream of solid components is used in the step of preparing a pulp slurry.

18. A process for producing granular absorbent material, comprising:
   preparing a pulp slurry from waste paper that includes kaolin clay and other solid components;
   separating from the pulp slurry a stream which is in the form of a slurry containing kaolin clay;
   adding a first flocculating polymer and air to the stream;
   clarifying the stream in a flotation clarifier to produce a concentrated stream of solid components containing kaolin clay;
   adding a second flocculating polymer to the concentrated stream;
   passing the concentrated stream containing the second flocculating polymer through a belt press to form a filter cake in a single dewatering step having a consistency of 35 to 45 percent and containing kaolin clay;
   forming granular material from the filter cake; and drying the granular material to produce granular absorbent material.

19. The process according to claim 18, wherein the step of drying the granular material includes drying the granular material to produce granular absorbent material having a solids content of at least 90%.

20. The process according to claim 18, wherein the water removed from the concentrated stream of solid components is used in the step of preparing the pulp slurry.

21. A process for producing granular absorbent material, comprising:

preparing a pulp slurry from waste paper that includes kaolin clay and other solid components;

separating from the pulp slurry a stream which is in the form of a slurry containing kaolin clay;

adding flocculating polymer and air to the stream;

clarifying the stream in a flotation clarifier to produce a concentrated stream of solid components containing kaolin clay;

removing water and forming granular material containing kaolin clay from the concentrated stream of solid components;

heating the concentrated stream of solid components containing kaolin clay to pasteurization temperature before the removal of water and formation of granular material containing kaolin clay; and drying the granular material to produce granular absorbent material.

22. A process for making a granular absorbent material from waste paper containing at least kaolin clay and papermaking fibers, comprising the steps of:

a) forming a pulp slurry from waste paper containing at least water, kaolin clay, and papermaking fibers;

b) passing the pulp slurry through washer screens arranged to retain papermaking fibers on the screens and to pass a reject stream through the screens, the reject stream from the screen containing at least water and kaolin clay and less than 10 percent papermaking fibers;

c) conducting papermaking fibers from the screens through cleaning and deinking devices and from such devices to a papermaking machine;

d) clarifying the reject stream by flotation to produce a concentrated stream of solid components including kaolin clay, the concentrated stream having a consistency of 3 to 7 percent;

e) dewatering the concentrated stream in a belt press to form a filter cake in a single dewatering step having a consistency of between 35 and 40 percent;

f) forming granules having less than 10 percent papermaking fibers from the filter cake, including passing the filter cake through a pin mixer to produce granules having a consistency of 35 to 45 percent; and g) drying the granules until the granules have a solids content greater than 90 percent.

23. The process according to claim 22, including transporting the filter cake from the belt press to the pin mixer in a screw conveyor.

24. The process according to claim 22, wherein the drying step occurs after the granules are discharged from the pin mixer.

25. The process according to claim 22, wherein the granules from the drying step have a bulk density of 28 to 35 lbs. per cubic foot.

26. The process according to claim 22, wherein the water from the dewatering step is returned for use in the pulp slurry forming step.

* * * * *